Patented Nov. 7, 1933

1,934,610

UNITED STATES PATENT OFFICE 1,934,610

PROCESS OF PRODUCING HYDROGEN CYANIDE

Thomas Sherlock Wheeler, Northwich, England, assignor to Imperial Chemical Industries Limited, London, England, a British company No Drawing. Application March 18, 1930, Serial No. 436,910, and in Great Britain March 27, 1929

6 Claims. (Cl. 23—151)

The invention relates to the production of hydrocyanic acid by the interaction at high temperatures between ammonia and hydrocarbon gases. The expression "hydrocarbon gases" includes hydrocarbons such as methane, ethane and the lower members of the paraffin series, unsaturated and aromatic hydrocarbons, natural or industrial gases containing such hydrocarbons, or other hydrocarbons which are gaseous under the working conditions and which react to produce hydrocyanic acid gas.

The reactions which take place may be typically expressed by the following equations:—

With methane:—$CH_4 + NH_3 = HCN + 3H_2$
or with ethane $C_2H_6 + 2NH_3 = 2HCN + 5H_2$ It will be seen that other undesired reactions may also occur, and in particular decomposition of ammonia to its elements, decompositions of hydrocarbons to form solid carbon, and polymerization or decomposition of the hydrocyanic acid formed, should be avoided.

It has already been proposed to effect reaction between methane and ammonia at high temperatures to form hydrocyanic acid and also to form hydrocyanic acid gas and carbon. I find that the formation of carbon is exceedingly inconvenient from the point of view of operation of a continuous process since carbon deposits necessitate frequent stoppages for purging otherwise the apparatus becomes choked.

The present invention provides a process in which a high yield of hydrocyanic acid gas is obtained with the minimum production of carbon and the minimum decomposition of ammonia into its elements. In practice it has been found difficult to reconcile these requirements since different conditions affect these requirements differently. For example high temperature increases yield of hydrocyanic acid but increases decomposition of methane and ammonia into their elements; if it is attempted to overcome the undesired decomposition by rapid passage of gas, the yield of hydrocyanic acid falls off after a certain point. Again, the shape and nature of the reaction chamber affects the main reaction and the side reactions differently.

However a combination of measures has now been discovered by which the desired result can be obtained.

According to the invention, a gas containing hydrocarbon and more than one molecular proportion of ammonia for each atomic proportion of carbon in the hydrocarbon is passed at a temperature of at least 1150° C. through an unpacked reaction chamber under conditions unfavourable to the decomposition of the reagents into their elements. In addition, it is preferred to use diluents, such as hydrogen or nitrogen, and also to add moisture to the gases.

Although ammonia is more expensive and in general more sensitive to the action of heated surfaces than methane, it has been found very advantageous to use an excess of ammonia, since this materially reduces the formation of carbon and increases the conversion of hydrocarbon to hydrocyanic acid. Although hydrogen is one of the reaction products, its presence does not cause serious decreases in yield of hydrocyanic acid, and it does assist in preventing formation of carbon. The presence of moisture also reduces carbon formation.

It has further been found that observance of the following conditions is required if maximum efficiency is to be attained:—

(1). The temperature should be as high as possible. In practice there is considerable difficulty in measuring the actual gas temperature and such gas temperature must be inferred from the temperature of the walls of the reaction chamber, due allowance being made for the size of the chamber. The inner wall temperature must be at least 1150° C. and with a wall temperature of around 1350–1450° C. the process can be carried out so as to give practically complete conversion.

(2). The time of exposure of the reaction mixture to the (inner wall) temperature exceeding 1150° C. should be short as otherwise there will be a tendency for decomposition of ammonia and hydrocarbon into their elements to occur, the latter leading to separation of carbon. The gas mixture should therefore be passed rapidly through the reaction zone. It is also advisable to bring the gas mixture as rapidly as possible to the reaction temperature by rapid heating, at any rate in the final stages of the heating. It is most advantageous to preheat the gas mixture and I have found that it is possible to preheat to temperatures of 900° C. or over, or even to 1000° C., without sensible decomposition, when the preheating is carried out rapidly. The remainder of the heat is then imparted very rapidly by passage through the reaction chamber as described. It is also desirable to cool the gases very rapidly immediately reaction has taken place. The waste heat may be utilized by heat interchange, for preheating.

(3). The nature of the reaction chamber should be such as to avoid as far as possible decomposition of ammonia and hydrocarbon into their elements. In practice this means that the presence of surfaces other than those necessary for imparting the required amount of heat to the reaction zone are avoided, and also care is taken that the surfaces are not of such a nature as to tend to cause decomposition. For example, smooth surfaces should be preferred to rough ones, and materials should not be used which contain substances liable to provoke cracking, e. g. bricks, containing iron dioxide. Suitable materials are glazed silica or sillimanite. The reaction chamber should be unpacked, that is, it should not contain either inert or catalytic materials apart from the bounding surfaces as the extended surface thereby offered to the gases is liable to cause decomposition thereof.

The foregoing remarks indicate the general desiderata in carrying out the improved process for the production of hydrocyanic acid. The raw materials can be derived from many sources, for example, suitable hydrocarbon gases exist in natural gas, coal gas, coke oven gas, gas from oil cracking plants or from destructive hydrogenation plants, and such gases may be used directly or after preliminary treatment, e. g. pyrolysis to form benzene hydrocarbons which are then removed, or after enrichment in hydrocarbons by any suitable method. It will generally be preferred to utilize a hydrocarbon-containing gas as it occurs in nature or as it is produced in some industrial process, without taking special steps to remove foreign constituents such as carbon monoxide or nitrogen. Ammonia will generally be available as aqueous solution or as liquid anhydrous ammonia, and in this case the requisite mixture of ammonia and hydrocarbon gas is most simply obtained by utilizing the hydrocarbon gas to vaporize the ammonia. Sulphur compounds should not be present in the hydrocarbon ammonia mixture and if necessary steps should be taken to purify the raw materials therefrom.

It is useful to remove carbon dioxide. Crude coke oven gas, for example, can be freed from sulphur compounds and carbon dioxide sufficiently for the purpose of the reaction by treatment with ammonia liquor, and this treatment can at the same time be adapted to charge the gas with the necessary amount of ammonia for the reaction.

The presence of moisture is useful in that it appears to reduce carbon formation and unless moisture is present already in the gas, it is preferred to add it, for example 2% by volume.

*Example 1*

The reaction chamber consists of an unpacked clear silica tube of effective length 30 cms. and diameter 2 cms. heated in an electric furnace to 1490° C. A gas mixture of composition:
Ammonia 55% by volume.
Methane 45% (of 95% purity, remainder chiefly $N_2$) is passed through at a space velocity of 100 reciprocal minutes. (Space velocity is defined as the number of volumes of hot gas passing through unit volume of reaction space per minute.) Under such conditions carbon deposition is practically nil, while the exit gases contain only slight traces of suspended carbon. The exit gases are cooled, and hydrocyanic acid removed by passing through 20 per cent caustic soda solution. The remaining gases are freed from ammonia by washing with sulphuric acid, and the residual gas analyzed to determine the content of hydrocarbon and hydrogen.

It was found that 93% of methane was converted to HCN, which comprised 21.2% of the exit gases from the reaction chamber. The residual gas, on analyzing consisted mainly of hydrogen. There was no appreciable ammonia decomposition.

*Example 2*

A gas mixture consisting of about 2 vols. of coal gas (ethane 4.27% methane 21.26% hydrogen 35.3% $CO_2$ 3.8% CO 6.2% nitrogen 25.57%) and one volume of ammonia, may be conveniently prepared by scrubbing the coal gas with 25% ammonia liquor, supplying heat as required to compensate for the absorption of heat subsequent upon the vaporization of the ammonia. This mixture is preheated to about 900° C. in a recuperator, and led to a reaction chamber consisting of a series of units of Pythagoras tubes 60 cms. in length and 5 cms. internal diameter, heated in a gas fired furnace at 1400° C. (at an estimated inner wall temperature of 1330° C.) and at a space velocity of 150 reciprocal minutes. The exit gas from the furnace contained about 12% HCN corresponding to a conversion of 62.8% hydrocarbon. Deposition of carbon was not appreciable and no decomposition of ammonia occurred.

A suitable type of reaction chamber is long and deep in relation to its width. A number of such units may be built side by side with heating flues interposed so as to form an apparatus of sandwich construction. Plane walls of sillimanite may be disposed about 2″ apart to form narrow reaction chambers heated on either side.

I declare that what I claim is:—

1. The process of producing hydrocyanic acid which consists in rapidly passing a gas containing a hydrocarbon and more than one molecular proportion of ammonia for each atomic proportion of carbon at a temperature of at least 1150° C. through an unpacked reaction chamber whereby conditions are provided unfavourable to the decomposition of the reagents into their elements.

2. A process as claimed in claim 1 in which moisture is present.

3. A process as claimed in claim 1 in which coke oven gas is treated with ammonia in the liquid phase to remove impurities and to add ammonia to the gas prior to heat treatment.

4. A process as claimed in claim 1 in which the mixture is preheated to about 1000° C.

5. The process of producing hydrocyanic acid which consists in passing a gas containing a hydrocarbon and more than one molecular proportion of ammonia for each atomic proportion of carbon at a temperature of at least 1150° C. through an unpacked reaction chamber at a space velocity of approximately not less than 100 reciprocal minutes whereby conditions are provided unfavorable to the decomposition of the reagents into their elements.

6. The process of producing hydrocyanic acid which comprises passing a gas substantially consisting of one or more of the gaseous hydrocarbons of the paraffin series together with more than one molecular proportion of ammonia for each atomic proportion of carbon at a temperature of at least 1150° C. through an unpacked reaction chamber at a space velocity of approximately not less than 100 reciprocal minutes whereby conditions are provided unfavorable to the decomposition of the reagents into their elements.

THOMAS SHERLOCK WHEELER.